US012567277B2

(12) United States Patent
Attar

(10) Patent No.: US 12,567,277 B2
(45) Date of Patent: Mar. 3, 2026

(54) SYSTEMS AND METHODS FOR IDENTIFYING SPECIFIC DOCUMENT TYPES FROM GROUPS OF DOCUMENTS USING OPTICAL CHARACTER RECOGNITION

(71) Applicant: Capital One Services, LLC, McLean, VA (US)

(72) Inventor: Aaron Attar, Dallas, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 632 days.

(21) Appl. No.: 17/939,903

(22) Filed: Sep. 7, 2022

(65) Prior Publication Data

US 2024/0078829 A1 Mar. 7, 2024

(51) Int. Cl.
*G06V 30/42* (2022.01)
*G06V 10/94* (2022.01)
*G06V 30/10* (2022.01)
*G06V 30/414* (2022.01)
*G06V 30/416* (2022.01)

(52) U.S. Cl.
CPC ............ *G06V 30/42* (2022.01); *G06V 10/945* (2022.01); *G06V 30/10* (2022.01); *G06V 30/414* (2022.01); *G06V 30/416* (2022.01)

(58) Field of Classification Search
CPC ...... G06V 30/42; G06V 10/945; G06V 30/10; G06V 30/414; G06V 30/416
See application file for complete search history.

(56) References Cited

U.S. PATENT DOCUMENTS

| | | | |
|---|---|---|---|
| 8,204,293 B2 | 6/2012 | Csulits et al. | |
| 8,483,473 B2 | 7/2013 | Roach et al. | |
| 9,466,014 B2 | 10/2016 | Gorski et al. | |
| 10,395,772 B1 * | 8/2019 | Lucas .................... | G16H 10/60 |
| 2020/0005032 A1 * | 1/2020 | Freed .................... | G06Q 10/10 |

FOREIGN PATENT DOCUMENTS

| | | |
|---|---|---|
| CN | 108491787 A | 9/2018 |
| CN | 108491789 A | 9/2018 |
| CN | 109360086 A | 2/2019 |

(Continued)

*Primary Examiner* — Matthew C Bella
*Assistant Examiner* — Janice E. Vaz
(74) *Attorney, Agent, or Firm* — TROUTMAN PEPPER LOCKE LLP; Christopher J. Forstner; John A. Morrissett

(57) ABSTRACT

Disclosed embodiments may include a system for identifying a statement. This may include receiving document image data which is then processed using optical character recognition to create language data and position data. The system may include identifying a plurality of dates from the language data and determining whether the plurality of dates is aligned in a first direction using the position data. The system may include determining whether the plurality of dates is within a predetermined time threshold or counting the plurality of dates to determine whether the count is greater than a predetermined count threshold. The system may create a label for the document and generate and transmit a graphical user interface to a user device for displaying the label and/or the document image data. The user may be able to interact with the user device to change the document label.

19 Claims, 6 Drawing Sheets

(56) References Cited

FOREIGN PATENT DOCUMENTS

| | | | |
|---|---|---|---|
| CN | 110929580 | A | 3/2020 |
| CN | 111091090 | A | 5/2020 |
| CN | 111414889 | A | 7/2020 |
| CN | 111814598 | A | 10/2020 |
| CN | 112016481 | A | 12/2020 |
| CN | 112395996 | A | 2/2021 |
| CN | 112463726 | A | 3/2021 |
| CN | 112668571 | A | 4/2021 |

* cited by examiner

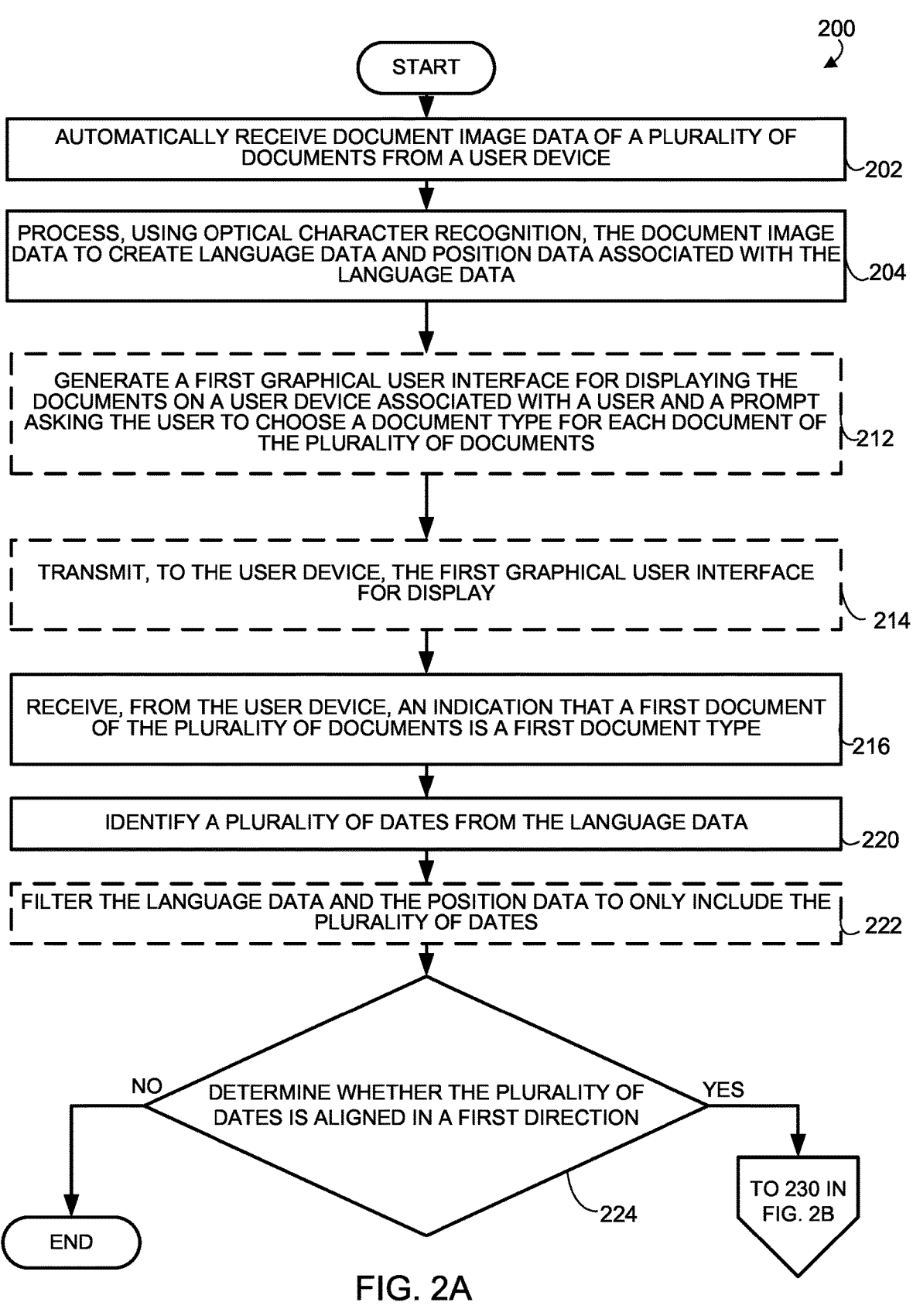

200

START

AUTOMATICALLY RECEIVE DOCUMENT IMAGE DATA OF A PLURALITY OF DOCUMENTS FROM A USER DEVICE ⌐202

PROCESS, USING OPTICAL CHARACTER RECOGNITION, THE DOCUMENT IMAGE DATA TO CREATE LANGUAGE DATA AND POSITION DATA ASSOCIATED WITH THE LANGUAGE DATA ⌐204

GENERATE A FIRST GRAPHICAL USER INTERFACE FOR DISPLAYING THE DOCUMENTS ON A USER DEVICE ASSOCIATED WITH A USER AND A PROMPT ASKING THE USER TO CHOOSE A DOCUMENT TYPE FOR EACH DOCUMENT OF THE PLURALITY OF DOCUMENTS ⌐212

TRANSMIT, TO THE USER DEVICE, THE FIRST GRAPHICAL USER INTERFACE FOR DISPLAY ⌐214

RECEIVE, FROM THE USER DEVICE, AN INDICATION THAT A FIRST DOCUMENT OF THE PLURALITY OF DOCUMENTS IS A FIRST DOCUMENT TYPE ⌐216

IDENTIFY A PLURALITY OF DATES FROM THE LANGUAGE DATA ⌐220

FILTER THE LANGUAGE DATA AND THE POSITION DATA TO ONLY INCLUDE THE PLURALITY OF DATES ⌐222

DETERMINE WHETHER THE PLURALITY OF DATES IS ALIGNED IN A FIRST DIRECTION

NO

YES

224

END

SYSTEMS AND METHODS FOR IDENTIFYING SPECIFIC DOCUMENT TYPES FROM GROUPS OF DOCUMENTS USING OPTICAL CHARACTER RECOGNITION

The disclosed technology relates to systems and methods for identifying certain document types that have specific characteristics by utilizing optical character recognition. Specifically, this disclosed technology can be used to identify, for example, a statement, by recognizing and comparing dates within a document.

BACKGROUND

Statements are a useful tool in modern accounting and banking. Statements allow a person to easily view the transactions or interactions on an account. At quick glance, a statement can show a person a plethora of information. More specifically, the person can see income deposits and withdrawals to pay for items. As such, because a statement can be a valuable assessment of an individual's income and spending habits, many lenders frequently review a person's bank statements before giving them a loan on a house or car. When making a large purchase requiring a loan, in many cases, a bank account statement is within the necessary 'bundle' of paperwork.

While computer methods of processing loan applications have increased in use, they still have numerous problems identifying some document types, like statements, for example. These problems are primarily because bank statements look different from bank to bank. As such, bank statements can come in an assortment of sizes and shapes, which makes it inherently difficult for computers to process and identify them accurately. Furthermore, if a person forgets to attach a bank statement, it can slow down the entire loan process.

Accordingly, there is a need for improved automated document recognition systems and methods for identifying particular document types. Embodiments of the present disclosure are directed to this and other considerations.

SUMMARY

Disclosed embodiments may include a system for identifying a statement. The system may include one or more processors, and memory in communication with the one or more processors and storing instructions that, when executed by the one or more processors, are configured to cause the system to identify a statement. The system may automatically receive document image data of a document from a user device. The system may also process, using optical character recognition, the document image data to create language data and position data associated with the language data. Additionally, the system may identify a plurality of dates from the language data. Furthermore, the system may determine, using the position data, whether the plurality of dates is aligned in a first direction. The system may also determine whether the plurality of dates is within a predetermined time threshold. The system may count the plurality of dates. Furthermore, the system may determine whether the count of the plurality of dates is greater than a predetermined count threshold. In response to determining that the plurality of dates is aligned in the first direction, determining that the plurality of dates is within the predetermined time threshold, and determining that the count is greater than the predetermined count threshold, the system may create a first label for the document, generate, a first graphical user interface for displaying a message to a user comprising the first label, and transmit, the first graphical user interface, to the user device for display.

Disclosed embodiments may include a system for identifying a statement. The system may include one or more processors, and memory in communication with the one or more processors and storing instructions that, when executed by the one or more processors, are configured to cause the system to identify a statement. The system may automatically receive document image data of a plurality of documents from a user device. The system may also process, using optical character recognition, the document image data to create language data and position data associated with the language data. The system may generate a first graphical user interface for displaying the documents on the user device associated with a user and a prompt asking the user to choose a document type for each document of the plurality of documents. Furthermore, the system may transmit, to the user device, the first graphical user interface for display. Additionally, the system may receive, from the user device, an indication that a first document of the plurality of documents is a first document type. The system may identify a plurality of dates from the language data. The system may also determine, using the position data, that the plurality of dates is aligned in a first direction. Additionally, the system may count the plurality of dates. Furthermore, the system may determine that the count of the plurality of dates is greater than a predetermined count threshold. In response to determining that the plurality of dates is aligned in the first direction and that the count of the plurality of dates is above the predetermined count threshold, the system may create a first label for the first document referring to the first document as the first document type.

Disclosed embodiments may include a system for identifying a statement. The system may include one or more processors, and memory in communication with the one or more processors and storing instructions that, when executed by the one or more processors, are configured to cause the system to identify a statement. The system may automatically receive document image data of a document from a user device. The system may also process, using optical character recognition, the document image data to create language data and position data associated with the language data. Additionally, the system may identify a plurality of dates from the language data. Furthermore, the system may determine, using the position data, that the plurality of dates is aligned in a first direction. The system may determine whether the plurality of dates is within a predetermined time threshold. In response to determining the plurality of dates is aligned in the first direction and determining that the plurality of dates is within the predetermined time threshold, the system may create a first label indicating the document is a first document type. In response to the first label indicating the document is the first document type, the system may generate a first graphical user interface for displaying a first message to a user stating the document is the first document type, and transmit the first graphical user interface to the user device for display. In response to determining the plurality of dates is not aligned in the first direction or determining that the plurality of dates is not within the predetermined time threshold, the system may generate a second graphical user interface for displaying a second message stating the document is not the first document type, and transmit the second graphical user interface to the user device for display.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIGS. 2A and 2B are a flow diagram illustrating an exemplary method for identifying a statement in accordance with certain embodiments of the disclosed technology.

DETAILED DESCRIPTION

Figure 1A:
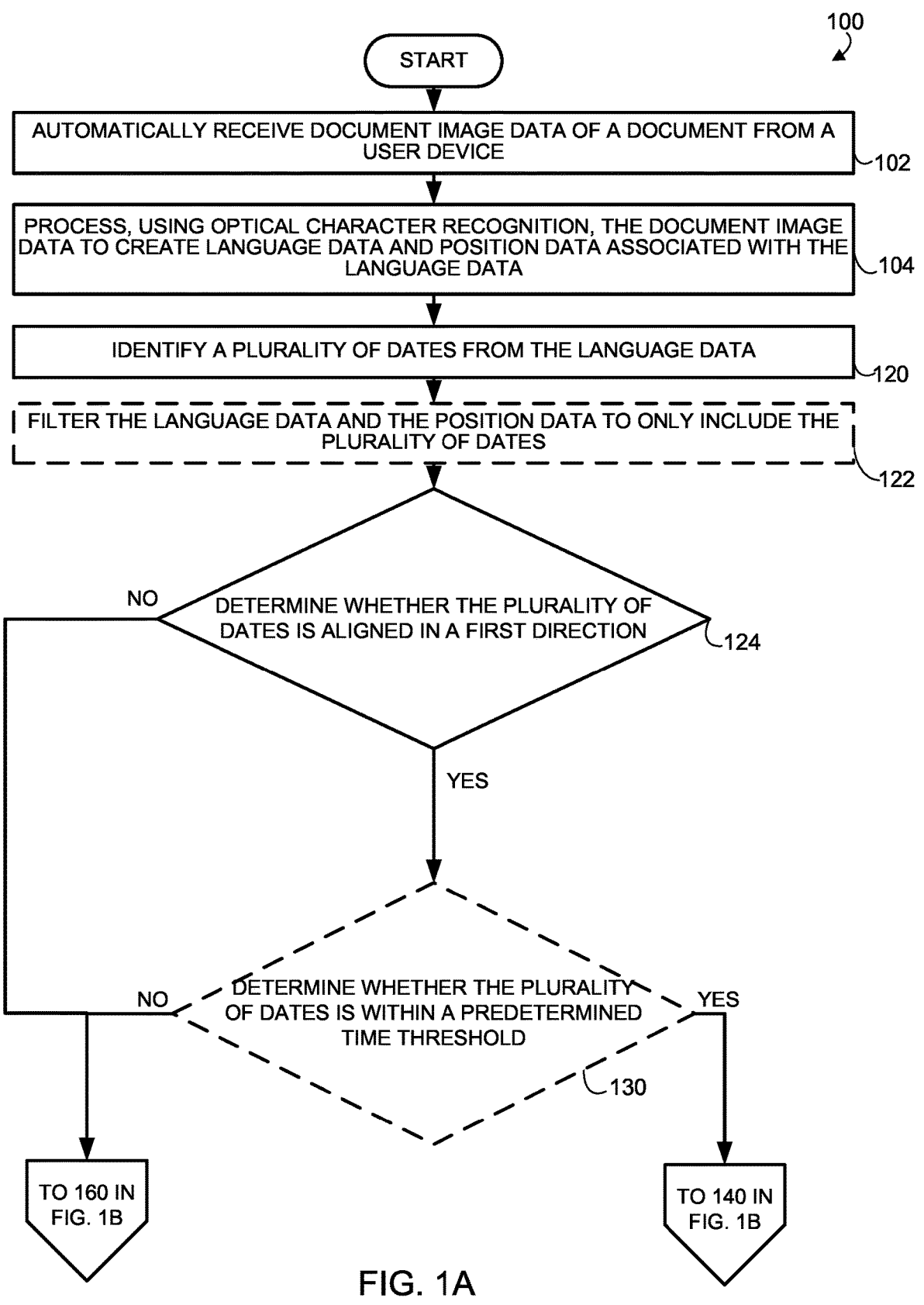
FIGS. 1A and 1B are a flow diagram illustrating an exemplary method for identifying a statement in accordance with certain embodiments of the disclosed technology.

Examples of the present disclosure related to systems and methods for identifying certain types of documents, such as documents displaying a date or time. Specifically, the present technology may be configured to recognize or determine which document out of a group of documents is a statement. This may be used to find bank statements, credit card statements, and generally any document that lists all the transactions of an account over a period of time. More generally, the system may be used to identify a document displaying an action associated with a date or timestamp (e.g., a log recording dates and times a door was opened). By identifying the plurality of associated dates or times, the system may be able to recognize which document in a group of documents is a log or ledger. Although various embodiments may be able to identify bank statements from other documents, the system may be configured to identify any document of a certain type from a plurality of documents.

More particularly, the disclosed technology relates to using optical character recognition technology to create language and position data and identify a plurality of dates. The systems and methods described herein utilize, in some instances, graphical user interfaces, which are necessarily rooted in computers and technology. Graphical user interfaces are a computer technology that allows for user interaction with computers through touch, pointing devices, or other means. The present disclosure details how to determine that a document is a statement by identifying a plurality of associated dates in a specific configuration. This, in some examples, may involve processing document image data and dynamically changing the graphical user interface according to determinations that result from processing the document image data. Using a graphical user interface in this way may allow the system to identify that a document is a statement more reliably and accurately. This is a clear advantage and improvement over prior technologies that have difficulty identifying statements because statements can be an assortment of different configurations. The present disclosure solves this problem by looking for a plurality of dates within the document, which is a common feature that all statements share. The system may also recognize if a required statement is missing from a 'bundle' of paperwork. Furthermore, examples of the present disclosure may also improve the speed with which computers can identify that a document is a statement by having lower computing power requirements since the system focuses primarily on dates and does not consider other, extraneous information that may be found on a statement. This also greatly increases processing speed. Overall, the systems and methods disclosed have significant practical applications in the document processing field because of the noteworthy improvements of identifying dates within a document to determine that a document is a statement, which is important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1B:
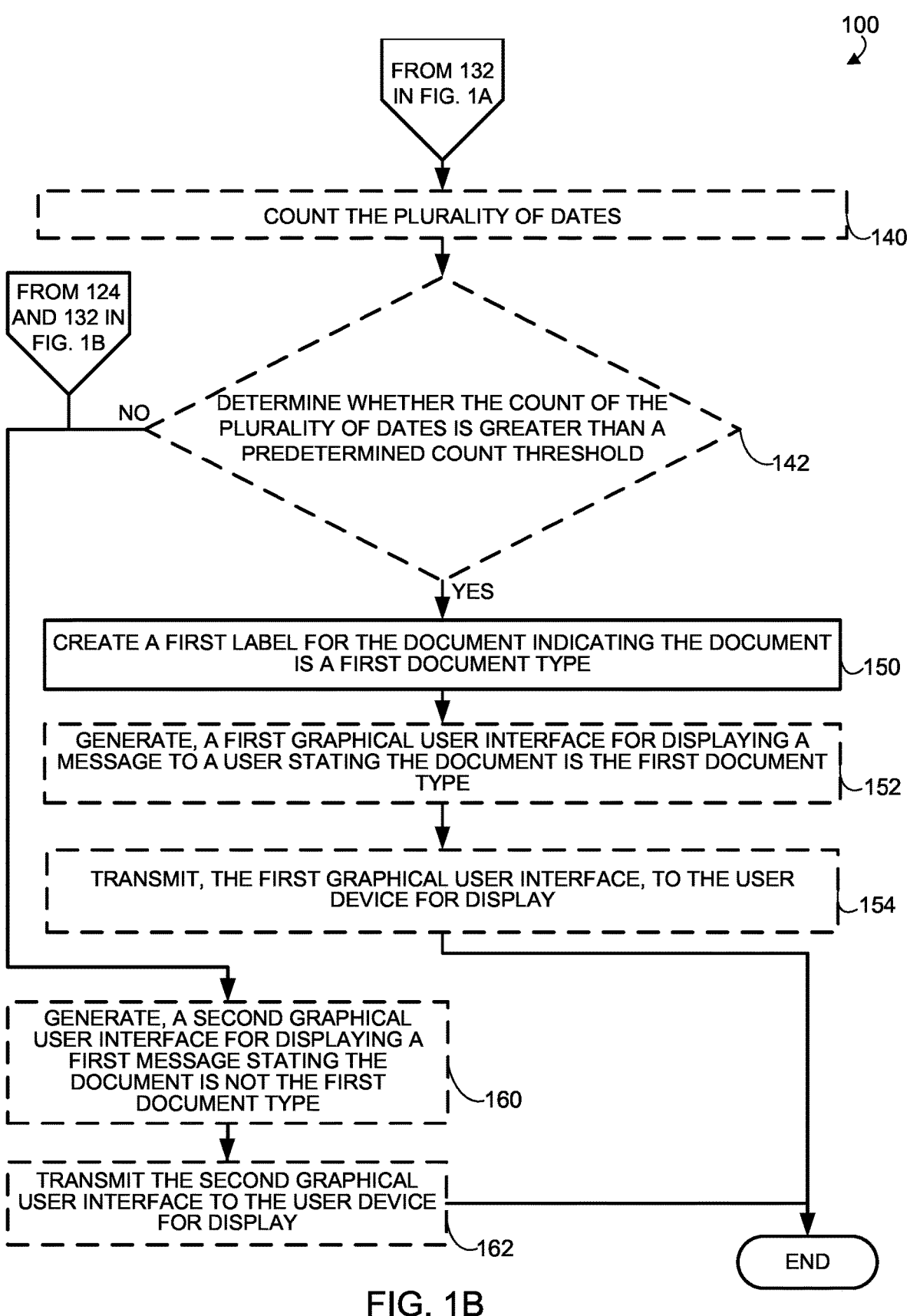

FIG. 1 is a flow diagram illustrating an exemplary method 100 for identifying a statement, in accordance with certain embodiments of the disclosed technology. The steps of method 100 may be performed by one or more components of the system 400 (e.g., statement identification system 320 or web server 410 of document system 408 or user device 402), as described in more detail with respect to FIGS. 3 and 4. Steps 124 through 142 may be completed by an algorithm or machine learning model.

In block 102, the statement identification system 320 may automatically receive document image data from a user device. The document image data may be scans of a document. The document may be a document of a single page or a plurality of pages. The document image data may include scans of several documents together. The document image data may be an application or a loan application. The loan application may be for a motor vehicle, recreational vehicle, home, or a number of other utilities. The statement identification system 320 may receive the document image data from the user device through a web-based upload portal. The user may not have to select submit for statement identification system 320 to receive the documents.

In block 104, the statement identification system 320 may process the document image data. Processing the document image data may involve using optical character recognition software. Optical character recognition is a technology that allows scans of print documents to be converted and interpreted as machine text. The optical character recognition may involve machine learning models. After processing the document image data, the statement identification system 320 may create language data and position data from the document image data. The language data may consist of letters, numbers, spaces, and may generally correspond to American Standard Code for Information Interchange (ASCII) characters. The language data, if characters, may be sorted into words, phrases, or blocks of text. The position data may be associated with or correspond to the language data. The position data may include coordinates or locations of certain letters, numbers, spaces, or characters. The position data may include cartesian coordinates corresponding to a location in a document image where a certain character occurs. The position data may be coordinated with the language data in an organizational array or table.

In block 120, the statement identification system 320 may identify a plurality of dates using the language data. The plurality of dates may be identified by blocks of characters in common date formats generally consisting of a pattern of numbers separated by a separator character like a dash, hyphen, comma, space, or slash, or combinations of separator characters (e.g., MM-DD-YYYY, MM-DD-YY, DD-MM-YYYY, DD-MM-YY, MM/DD/YYYY, MM/DD/YYYY, MM/DD/YY, DD/MM/YYYY, DD/MM/YY, or any similar formatting). The statement identification system 320 may identify dates by searching for any commonplace date format within the language data. In some cases, the statement identification system 320 may identify dates from formats that do not include a separator character (e.g., MMDDYYYY). The date may or may not include the year (e.g., MM-DD). The date may also have the year before the month or day (e.g., YYYY-MM-DD). The date may be written in a longer form (e.g., Thursday, Apr. 28, 2022). The date may have the name of the month used instead of the numeric indicator along with the numeric indicators of the day and year (e.g., Apr. 29, 2022, or 29 Apr. 2022). Abbreviations of the name of the month may also be used (e.g., April 29). Numeric indicators may include leading zeros. The statement identification system 320 may be capable of working with numerous different languages and/or symbols indicating a month, day, or year. The statement identification system 320 may identify the plurality of dates using a machine learning model or algorithm that may be trained by using inputs of other example statements. Identifying a certain piece of language or position data as a date, may include adding a flag or identifier to that piece of data.

In optional block 122, the statement identification system 320 may filter the language data and the position data to only include the plurality of dates. Statement identification system 320 may, for processing efficiency, and data storage space constraints, among other reasons filter the language data and the and the associated position data to only include the data surrounding the plurality of dates.

In block 124, the statement identification system 320 may determine whether the plurality of dates is aligned in a first direction. The statement identification may use the associated position data of the plurality of dates to see if the dates share a common or similar positional coordinate. For example, if all of the dates are aligned in a column, the statement identification system 320 may compare the X coordinate of all of the dates to see if the X coordinate is equal amongst the dates. The statement identification system 320 may use the X coordinate of the first character of the dates, the last character of the dates, or any character in between the first and last character. The statement identification system 320 may not require that the X coordinate is exactly equal among all the dates, but may, in that case, require that the X coordinate of one date is within a certain predetermined threshold of the X coordinate of the other dates (e.g., all the X coordinates must be within 0.1 of an inch of each other). This may allow for small variations in the coordinates of the dates to still allow the system to determine that there is a plurality of dates aligned in a single direction. The statement identification system 320 may further also analyze the Y coordinate if all the dates are arranged in a column to determine if all the Y coordinates are within a certain distance from each other (e.g., showing that the dates are all on different lines). Furthermore, the statement identification system 320 may also be able to determine if the dates are all aligned in a row using a similar method with the Y coordinates of the dates. If the statement identification system 320 finds that dates are aligned in a first direction, then the statement identification system 320 may proceed to block 130. If the statement identification system 320 finds that dates are not aligned in a first direction, then the statement identification system 320 may proceed to block 160 or stop processing the document.

In optional block 130, the statement identification system 320 may determine whether the plurality of dates is within a predetermined time threshold. The statement identification system 320 may use the language data to determine the range of dates that are found in the document. The statement identification system 320 may use a number of different time thresholds corresponding to different possible statement lengths (e.g., 14 days, 15 days, 30 days, 31 days, 60 days, or 90 days, among others). If all, or a high percentage, of all the dates on a document are within the time threshold, then the system moves onto step 140. For example, the statement identification system 320 may analyze the language data and determine that the first date on a document is Nov. 1, 2022 and the last date is Nov. 30, 2022. The statement identification system 320 may compare that to a threshold of 30 days, which indicates that the document may be a statement corresponding to a month (in this case, November). Since all the dates on the document are within a 30-day period, the statement identification system 320 proceeds to optional block 140. If the dates on the statement are not within a predetermined threshold, then the system may proceed to block 160 or stop processing the document.

Additionally, in optional block 130, the statement identification system 320 may determine whether the plurality of dates is consecutive or near-consecutive. For example, the statement identification system 320 may measure the amount of time between each date. The statement identification system 320 may average the amount of time between each date. If the average amount of time between each date is below a certain threshold (e.g., the average account activity/transaction was less than 5 days apart from each other) then the system may proceed to block 140. If the average amount of time between each date is above a certain threshold, then the statement identification system 320 may proceed to block 160 or stop processing the document.

Additionally, in optional block 130, the statement identification system 320 may also determine if the plurality of dates is within a secondary time threshold. The secondary time threshold may be different than the predetermined time threshold. If the statement identification system 320 determines that the plurality of dates is outside the predetermined time threshold but within a secondary time threshold, the statement identification system 320 may generate a graphical user interface with a prompt asking the user whether the document should continue to be analyzed as a document. The graphical user interface may be transmitted to a user device. The statement identification system 320 may receive a response from the user device indicating whether to proceed. This may allow for situations where the document is near the threshold but does not quite meet it. For example, if the predetermined date threshold range is 30 days, the secondary date threshold is 45 days, and the document has dates ranging for 32 days, the statement identification system 320 may ask the user if it should continue the process (along the path to optional block 140) instead of automatically continuing (along the path to optional block 160) and stating that the document is not a statement. The user may respond positively (that the statement identification system 320 should continue to determine if the document is a statement) or negative (that the statement identification system 320 should not continue to determine if the document is a statement). If the response received from the user is positive, the statement identification system 320 may re-execute the determination step of block 130 with the secondary threshold. If the response received from the user is negative, the statement identification system 320 will continue to follow the path to optional block 160.

In optional block 140, the statement identification system 320 may count the plurality of dates. This may involve the statement identification system 320 counting each piece of language data that corresponds to a date.

In optional block 142, the statement identification system 320 may determine whether the count of the plurality of dates is greater than a predetermined count threshold. The predetermined count threshold may by a minimum number of dates that the statement identification system 320 needs to find on a document (e.g., 10). The predetermined count threshold may be a preset static value. The predetermined count threshold may be a variable and may change based on prior bank statements received. The predetermined count threshold may be a self-learning, changing, and adjusting part of the algorithm or machine learning model used for statement identification system 320. For example, the statement identification system 320 may determine that there are 15 dates on the document. The predetermined count threshold may be 8 dates. Since 15 is greater than 8, the statement identification system 320 would determine that the number of dates on the document is greater than the threshold and proceed to block 150. If the statement identification system 320 determined that the number of dates on the statement was less than the predetermined count threshold, then the statement identification system 320 may proceed to block 160 or stop processing the document.

Additionally, in optional block 142, the statement identification system 320 may also determine if the count is within a secondary count threshold. The secondary count threshold may be different than the predetermined count threshold. If the statement identification system 320 determines that the count outside the predetermined count threshold but within a secondary count threshold, the statement identification system 320 may also generate a graphical user interface with a prompt asking the user whether the document should continue to be analyzed as a statement. The graphical user interface may be transmitted to a user device. The statement identification system 320 may receive a response from the user device indicating whether to proceed. This may allow for situations where the document is near the threshold but does not quite meet it. For example, if the predetermined count threshold range is 10 dates, the secondary count threshold is 8 dates, and the document has 9 dates, the statement identification system 320 may ask the user if it should continue the process (along the path to optional block 140) instead of automatically continuing (along the path to optional block 160) and stating that the document is not a statement. The user may respond positively (that the statement identification system 320 should continue to determine if the document is a statement) or negative (that the statement identification system 320 should not continue to determine if the document is a statement). If the response received from the user is positive, the statement identification system 320 may re-execute the determination step of block 130 with the secondary threshold. If the response received from the user is negative, the statement identification system 320 will continue to follow the path to optional block 160.

In block 150, the statement identification system 320 may create a first label for the document indicating that the document is a first document type. If statement identification system 320 passes a document through blocks 124, 130, and 142, then that document is determined to be a first document type. The first document type may be a statement. The label may refer to the document generically as a statement or it may have a more specific value, such as "bank account statement". The label may be applied to more than one page of a document.

In optional block 152, the statement identification system 320 may generate a first graphical user interface for displaying a message to a user. The message may state that the document is the first document type or may display the label. The graphical user interface may display the document image data for the user to inspect and verify the label. The user may be able to interact with the graphical user interface on their mobile device to enlarge and zoom in on the document image data. Furthermore, the graphical user interface may contain an option for user to override the determination of the statement identification system 320 if they feel the label is incorrect. The graphical user interface may contain a dropdown menu for the user to choose a new label for the document. The graphical user interface may contain a checking system for a user to check a box to verify that the document is a statement. The user's revision of the label on the graphical user interface may change the label within statement identification system 320.

In optional block 154, the statement identification system 320 may transmit the first graphical user interface to the user device for display. The graphical user interface may work with both touchscreen devices (e.g., a smart phone) and non-touchscreen devices using a pointer (e.g., a computer with a mouse). The user device may or may not be a mobile device. The graphical user interface may require a specific application to be installed on the user device to display. Alternatively, the graphical user interface may be displayed on a webpage using a browser.

In optional block 160, the statement identification system 320 may generate a second graphical user interface for displaying a message to a user. The message may state that the document is not a first document type or may display a label. The label may indicate that the document is not a statement. The graphical user interface may display the document image data for the user to inspect and verify the label. The user may be able to interact with the graphical user interface on their mobile device to enlarge and zoom in on the document image data. Furthermore, the graphical user interface may contain an option for user to override the determination of the statement identification system 320 if they feel the label is incorrect. The graphical user interface may contain a dropdown menu for the user to choose a new label for the document. The graphical user interface may contain a checking system for a user to check a box to verify that the document is a statement. The second graphical user interface may give the user an option to rescan the document. This may allow the process to start over again on the newly scanned documents.

In optional block 162, the statement identification system 320 may transmit the second graphical user interface to the user device for display. The graphical user interface may work with both touchscreen devices (e.g., a smart phone) and non-touchscreen devices using a pointer (e.g., a computer with a mouse). The user device may or may not be a mobile device. The graphical user interface may require a specific application to be installed on the user device to display. Alternatively, the graphical user interface may be displayed on a webpage using a browser.

If the user changes the label in the first or second graphical user interfaces, the statement identification system 320 may change, modify, or revise the label value. To show the label value change, the statement identification system 320 may generate a third graphical user interface for displaying the revised label. The third graphical user may be transmitted to the user device for display. Furthermore, if the user changes the label, the statement identification system 320 may record and store the label change. The data regarding the label change may be used to train the algorithm or machine learning model. The data may also be used to modify the predetermined time threshold or predetermined count threshold. The label change may also be or accompany modification instructions.

Additionally, the graphical user interface generated and transmitted to the first user device may be a combination of blocks 152, 154, 160, and 162. For example, the graphical user interface may, for a 6-page document, display a message stating that page 1 has a "statement" label and pages 2-6 have a "not a statement" label. The graphical user interface may show the user the document image data of each page accompanied by the labels of "statement" or "not a statement". Furthermore, if the entire bundle of documents does not contain a statement, the statement identification system 320 may attach the "not a statement" label to the entire bundle of documents. This may further cause the statement identification system 320 to generate and transmit a graphical user interface to the user asking the user if they forgot to attach a statement. The graphical user interface may include a prompt to add more documents or rescan documents.

Figure 2B:
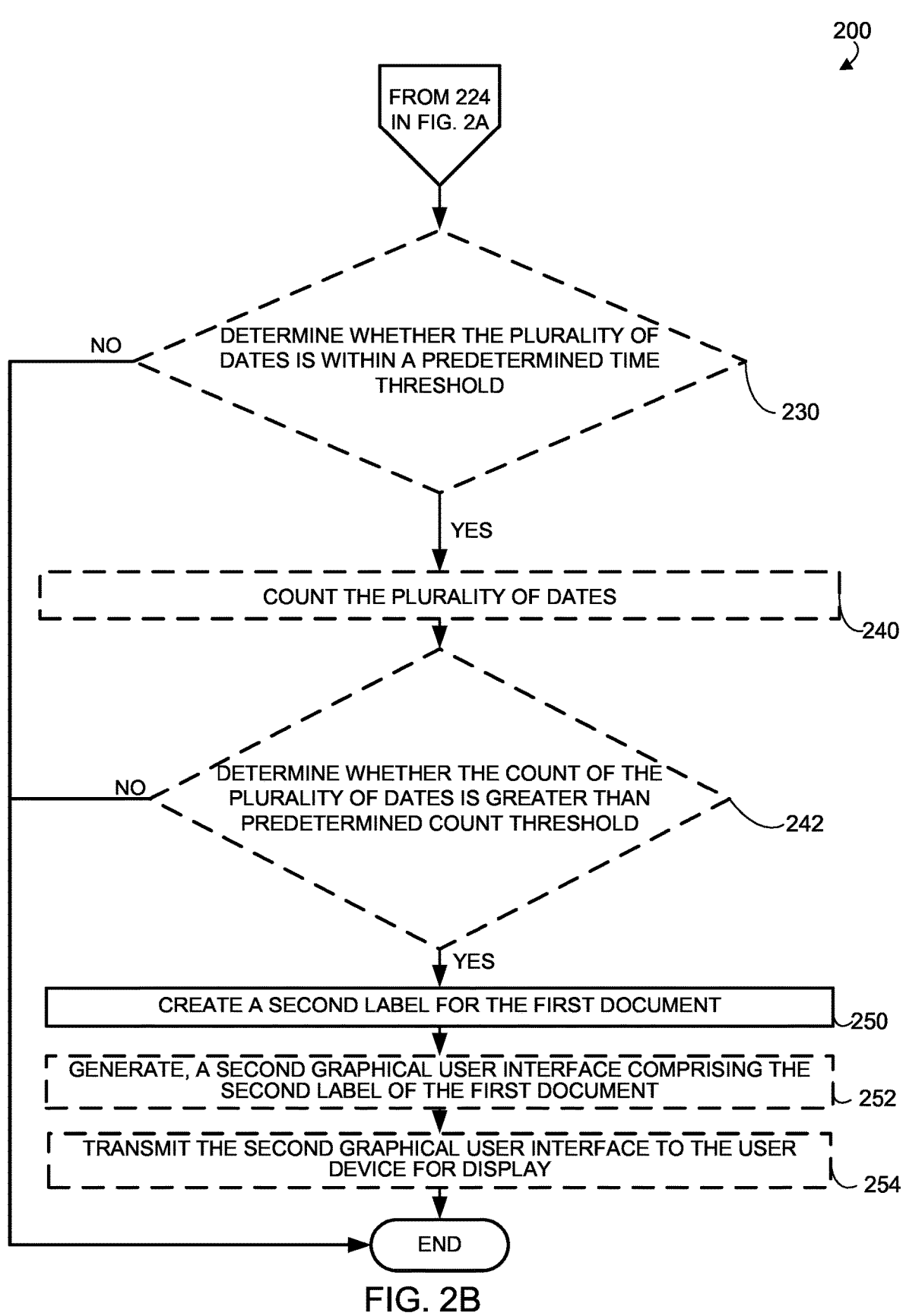

FIG. 2 is a flow diagram illustrating an exemplary method 200 for identifying a statement, in accordance with certain embodiments of the disclosed technology. The steps of method 200 may be performed by one or more components of the system 400 (e.g., statement identification system 320 or web server 410 of document system 408 or user device 402), as described in more detail with respect to FIGS. 3 and 4.

Method 200 of FIG. 2 is similar to method 100 of FIG. 1, except that method 200 may not include blocks 108 or 114 of method 100. The descriptions of blocks 202, 204, 220, 222, 224, 230, 240, 242, 250, 252, and 254 in method 200 are similar to the respective descriptions of blocks 102, 104, 120, 122, 124, 130, 140, 142, 150, 152 and 154 of method 100 and are not repeated herein for brevity. Additional blocks 212, 214, and 216 are also described below. Method 200 may also include steps similar to blocks 160 and 162, and method 200 may send non-statement documents to steps 160 and 162 in lieu of discontinuing document processing. To the extent that method 100 refers to a document, method 200 may refer similarly to a plurality of documents.

In optional block 212, the statement identification system 320 may generate a first graphical user interface for displaying documents on a user device associated with the user. The graphical user interface may display the document image data for the user to inspect. The user may be able to interact with the graphical user interface on their mobile device to enlarge and zoom in on the document image data. Furthermore, the graphical user interface may contain a prompt asking the user to choose a document type for each document. The graphical user interface may contain a drop-down menu for the user to choose a label for the document.

The label may be an indication. The indication may be a check box to indicate that the document is a statement.

In optional block 214, the statement identification system 320 may transmit the first graphical user interface to the user device for display. The graphical user interface may work with both touchscreen devices (e.g., a smart phone) and non-touchscreen devices using a pointer (e.g., a computer with a mouse). The graphical user interface may require a specific application to be installed on the user device to display. Alternatively, the graphical user interface may be displayed on a webpage using a browser.

In block 216, the statement identification system 320 may receive, from the user device, an indication that a first document of the plurality of documents is a first document type. This step allows the user to 'pre-screen' the documents. The statement identification system 320 may then confirm the user's indication regarding the documents after running through the blocks of method 200. For example, if the user indicates that a document is a statement, the statement identification system 320 can confirm the indication and make the second label of step 252 the same as the indication. On the contrary, if the statement identification system 320 finds that the user-indicated statement is not a statement or a different document is a statement that the user did not indicate, then the statement identification system 320 may generate and transmit a graphical user interface indicating the discrepancy to the user.

Figure 3:
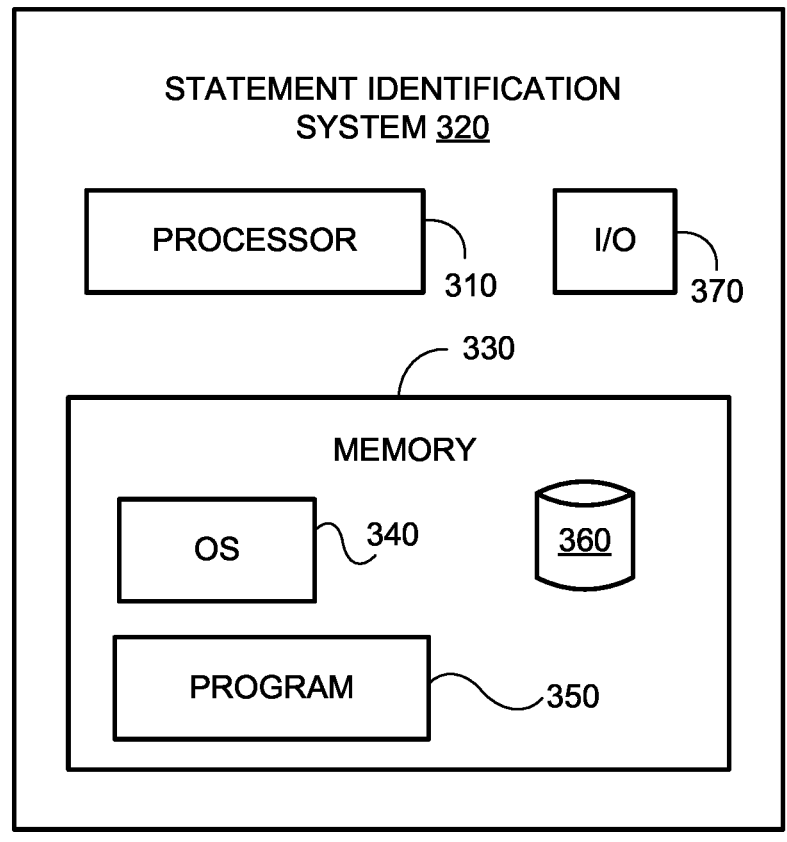
FIG. 3 is block diagram of an example statement identification system, according to an example implementation of the disclosed technology.
Figure 4:
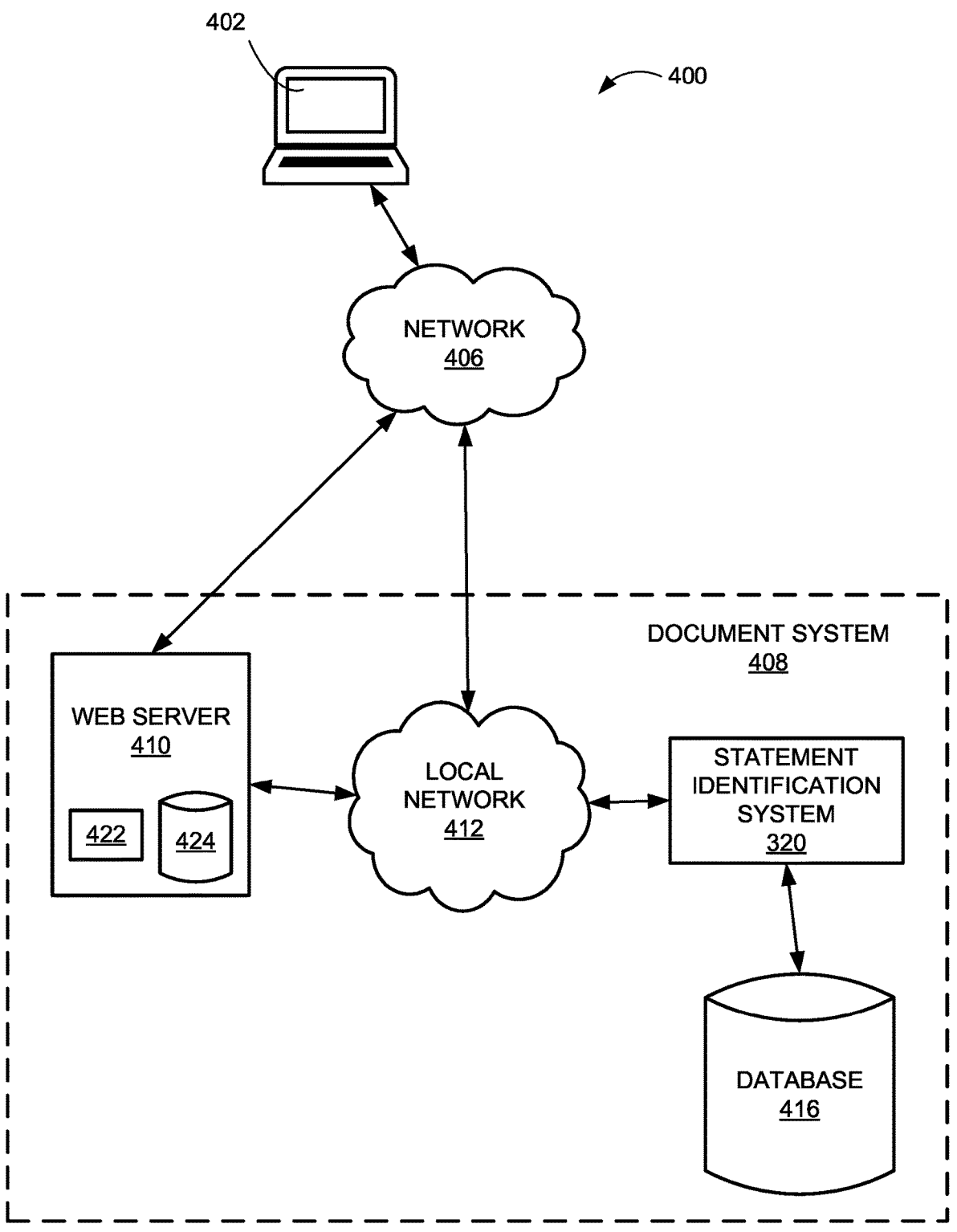
FIG. 4 is block diagram of an example system that may be used to identify a statement, according to an example implementation of the disclosed technology.

FIG. 3 is a block diagram of an example statement identification system 320 used to identify if a document is a statement according to an example implementation of the disclosed technology. According to some embodiments, the user device 402 and web server 410, as depicted in FIG. 4 and described below, may have a similar structure and components that are similar to those described with respect to statement identification system 320 shown in FIG. 3. As shown, the statement identification system 320 may include a processor 310, an input/output (I/O) device 370, a memory 330 containing an operating system (OS) 340 and a program 350. In certain example implementations, the statement identification system 320 may be a single server or may be configured as a distributed computer system including multiple servers or computers that interoperate to perform one or more of the processes and functionalities associated with the disclosed embodiments. In some embodiments statement identification system 320 may be one or more servers from a serverless or scaling server system. In some embodiments, the statement identification system 320 may further include a peripheral interface, a transceiver, a mobile network interface in communication with the processor 310, a bus configured to facilitate communication between the various components of the statement identification system 320, and a power source configured to power one or more components of the statement identification system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, Zig-Bee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read-only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the statement identification system 320 may include one or more storage devices configured to store information used by the processor 310 (or other components) to perform certain functions related to the disclosed embodiments. In one example, the statement identification system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The statement identification system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the statement identification system 320 may include the memory 330 that may include one or more programs 350 to perform one or more functions of the disclosed embodiments. For example, in some embodiments, the statement identification system 320 may additionally manage dialogue and/or other interactions with the customer via a program 350.

The processor 310 may execute one or more programs 350 located remotely from the statement identification system 320. For example, the statement identification system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a statement identification system database 360 for storing related data to enable the statement identification system 320 to perform one or more of the processes and functionalities associated with the disclosed embodiments.

The statement identification system database 360 may include stored data relating to status data (e.g., average session duration data, location data, idle time between sessions, and/or average idle time between sessions) and historical status data. According to some embodiments, the functions provided by the statement identification system database 360 may also be provided by a database that is external to the statement identification system 320, such as the database 416 as shown in FIG. 4.

The statement identification system 320 may also be communicatively connected to one or more memory devices (e.g., databases) locally or through a network. The remote memory devices may be configured to store information and may be accessed and/or managed by the statement identification system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The statement identification system 320 may also include one or more I/O devices 370 that may comprise one or more interfaces for receiving signals or input from devices and providing signals or output to one or more devices that allow data to be received and/or transmitted by the statement identification system 320. For example, the statement identification system 320 may include interface components, which may provide interfaces to one or more input devices, such as one or more keyboards, mouse devices, touch screens, track pads, trackballs, scroll wheels, digital cameras, microphones, sensors, and the like, that enable the statement identification system 320 to receive data from a user (such as, for example, via the user device 402).

In examples of the disclosed technology, the statement identification system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The statement identification system 320 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LS™) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The statement identification system 320 may be configured to adjust model parameters during training. Model parameters may include weights, coefficients, offsets, or the like. Training may be supervised or unsupervised.

The statement identification system 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The statement identification system 320 may be configured to optimize statistical models using known optimization techniques.

Furthermore, the statement identification system 320 may include programs configured to retrieve, store, and/or analyze properties of data models and datasets. For example, statement identification system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The statement identification system 320 may include algorithms to determine a data type, key-value pairs, row-column data structure, statistical distributions of information such as keys or values, or other property of a data schema may be configured to return a statistical profile of a dataset (e.g., using a data-profiling model). The statement identification system 320 may be configured to implement univariate and multivariate statistical methods. The statement identification system 320 may include a regression model, a Bayesian model, a statistical model, a linear discriminant analysis model, or other classification model configured to determine one or more descriptive metrics of a dataset. For example, statement identification system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The statement identification system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, statement identification system 320 may be configured to generate a similarity metric representing a measure of similarity between data in a dataset. A similarity metric may be based on a correlation, covariance matrix, a variance, a frequency of overlapping values, or other measure of statistical similarity.

The statement identification system 320 may be configured to generate a similarity metric based on data model output, including data model output representing a property of the data model. For example, statement identification system 320 may be configured to generate a similarity metric based on activation function values, embedding layer structure and/or outputs, convolution results, entropy, loss functions, model training data, or other data model output). For example, a synthetic data model may produce first data model output based on a first dataset and produce second data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The statement identification system 320 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The statement identification system 320 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, statement identification system 320 is configured to generate and/or train a classification model to classify a dataset, consistent with disclosed embodiments.

While the statement identification system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the statement identification system 320 may include a greater or lesser number of components than those illustrated.

FIG. 4 is a block diagram of an example system that may be used to view and interact with document system 408, according to an example implementation of the disclosed technology. The components and arrangements shown in FIG. 4 are not intended to limit the disclosed embodiments as the components used to implement the disclosed processes and features may vary. As shown, document system 408 may interact with a user device 402 via a network 406. In certain example implementations, the document system 408 may include a local network 412, a statement identification system 320, a web server 410, and a database 416.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the document system 408. In some embodiments, the user device 402 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the document system 408. Users may also include car dealerships who are seeking to submit loan paperwork on behalf of their customers. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The document system 408 may be associated with and optionally controlled by one or more entities such as a business, corporation, individual, partnership, or any other entity that provides one or more of goods, services, and consultations to individuals such as customers. In some embodiments, the document system 408 may be controlled by a third party on behalf of another business, corporation, individual, partnership. The document system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the statement identification system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the document system 408 to interact with one another and to connect to the network 406 for interacting with components in the system 400 environment. In some embodiments, the local network 412 may include an interface for communicating with or linking to the network 406. In other embodiments, certain components of the document system 408 may communicate via the network 406, without a separate local network 406.

The document system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access document system 408 using the cloud computing environment. User device 402 may be able to access document system 408 using specialized software. The cloud computing environment may eliminate the need to install specialized software on user device 402.

In accordance with certain example implementations of the disclosed technology, the document system 408 may include one or more computer systems configured to compile data from a plurality of sources the statement identification system 320, web server 410, and/or the database 416. The statement identification system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Example Use Case

The following example use case describes an example of a typical user flow pattern. This section is intended solely for explanatory purposes and not in limitation.

In one example, Celeste is trying to buy a car from a car dealer, John. Celeste gives John all the completed necessary paperwork to send off to obtain a car loan, including a bank statement showing her monthly income. John stacks all the papers together for the loan and scans them to his computer as a single file of multiple pages. John then opens up a web application on the web browser of his computer to access the loan provider's system. John uploads the scan to the web application. The statement identification system 320 automatically receives the document image data for each page and processes the pages using optical character recognition. The optical character recognition creates language data and position data for the pages. The statement identification system 320 then identifies a plurality of dates on a number of pages. The statement identification system 320 then determines that of the 33 pages uploaded, only 20 contain dates. Therefore, for the pages that contain dates, statement identification system 320 determines whether the dates on the 20 pages are aligned vertically. Of the 20 pages containing dates, only 3 pages have dates aligned vertically. Then, statement identification system 320 determines for those 3 pages whether the dates identified are within a predetermined time threshold of 30 days. Of the 3 pages, the first, page 21, has dates within 29 days, and the second, page 6, has days within 14 days. The third, page 18, has dates across 135 days. For page 21 and page 6, statement identification system 320 counts the number of dates. Page 21 has 18 dates and page 6 has 9 dates. The statement identification system 320, using a predetermined count threshold of 10, determines that the first page has a count greater than the threshold, but that the second page does not.

Since the secondary count threshold is 8, the statement identification system 320 determines that the count is between the predetermined count threshold and the secondary count threshold. Accordingly, the statement identification system 320 generates and transmits a prompt to the user asking if John would like to continue analyzing page 6 as a statement. John receives this message on his computer with a preview of the document image data for page 6. John selects an option that page does not need to continue to be reviewed as a statement.

The statement identification system 320 creates a first label for the first page, page 21, indicating that page 21 is a "statement". Additionally, all the other pages were labeled as "not statements" (by following along the "no" path to block 160). The statement identification system 320 generates a graphical user interface with a message to the user displaying that page 21 is a statement, and that all the other pages submitted are not statements. The statement identification system 320 transmits the graphical user interface to John's computer, where John can view the document image data of the pages and see page 21 is a statement and the other pages are not. John confirms the findings of the statement identification system 320 by checking the box. The documents for Celeste's car loan can then be sent to the loan provider.

In some examples, disclosed systems or methods may involve one or more of the following clauses:

Clause 1: A statement identification system comprising: one or more processors; memory in communication with the one or more processors and storing instructions that are configured to cause the system to: automatically receive document image data of a document from a user device; process, using optical character recognition, the document image data to create language data and position data associated with the language data; identify a plurality of dates from the language data; determine, using the position data, whether the plurality of dates is aligned in a first direction; determine whether the plurality of dates is within a predetermined time threshold; count the plurality of dates; determine whether the count of the plurality of dates is greater than a predetermined count threshold; responsive to determining that the plurality of dates is aligned in the first direction, determining that the plurality of dates is within the predetermined time threshold, and determining that the count is greater than the predetermined count threshold: create a first label for the document; generate, a first graphical user interface for displaying a message to a user comprising the first label; and transmit, the first graphical user interface, to the user device for display.

Clause 2: The system of clause 1, wherein the memory stores further instructions that are configured to cause the system to: generate, a second graphical user interface for displaying the document image data and a first prompt that allows the user to modify the first label; transmit the second graphical user interface to the user device for display; receive, from the user device, modification instructions for how to revise the first label; revise the first label of the document according to the modification instructions from the user device; generate a third graphical user interface for displaying the revised first label; and transmit the third graphical user interface to the user device for display.

Clause 3: The system of clause 2, wherein determining that the plurality of dates is in the first direction, determining that the plurality of dates is within the predetermined time threshold, and determining that the count is greater than the predetermined time threshold is completed by an algorithm trained by the modification instructions from the user device to revise the first label.

Clause 4: The system of clause 1, wherein determining that the plurality of dates is aligned in the first direction, determining that the plurality of dates is within the predetermined time threshold, and determining that the count is greater than the predetermined time threshold is completed by a machine learning model trained by examples of statements and user feedback.

Clause 5: The system of clause 1, wherein the memory stores further instructions that are configured to cause the system to: determine whether the plurality of dates is consecutive; and responsive to determining that the plurality of dates is aligned in the first direction, that the count of the plurality of dates is greater than the predetermined count threshold, that the plurality of dates is within the predetermined time threshold, and that the plurality of dates is consecutive, create a second label for the document.

Clause 6: The system of clause 1, wherein the position data comprises coordinate positions of the language data on a page and the memory stores further instructions that are configured to cause the system to: filter the language data and the position data to only include the plurality of dates.

Clause 7: The system of clause 1, wherein the memory stores further instructions that are configured to cause the system to: determine that the plurality of dates is outside the predetermined time threshold but within a secondary time threshold, wherein the secondary time threshold is different from the predetermined time threshold; generate a second graphical user interface with a second prompt asking the user whether the document should continue to be analyzed as a statement; transmit, the second graphical user interface to the user device; and receive, from the user device, an indication whether the document should be analyzed as the statement; responsive to determining that the plurality of dates is aligned in the first direction, determining that the plurality of dates is within the secondary time threshold, and determining that the count is greater than the predetermined count threshold: create a second label for the document; generate, a third graphical user interface for displaying the message to the user comprising the second label; and transmit, the third graphical user interface, to the user device for display.

Clause 8: The system of clause 1, wherein the memory stores further instructions that are configured to cause the system to: determine that the count of the plurality of dates is outside the predetermined count threshold but within a secondary count threshold, wherein the secondary count threshold is different from the predetermined count threshold; generate a second graphical user interface with a second prompt asking the user whether the document should continue to be analyzed as a statement; transmit, the second graphical user interface to the user device; and receive, from the user device, an indication whether the document should be analyzed as the statement responsive to determining that the plurality of dates is aligned in the first direction, determining that the plurality of dates is within the predetermined time threshold, and determining that the count is greater than the secondary count threshold: create a second label for the document; generate, a third graphical user interface for displaying the message to the user comprising the second label; and transmit, the third graphical user interface, to the user device for display.

Clause 9: A document identification system comprising: one or more processors; memory in communication with the one or more processors and storing instructions that are configured to cause the system to: automatically receive document image data of a plurality of documents from a user device; process, using optical character recognition, the document image data to create language data and position data associated with the language data; generate a first graphical user interface for displaying the documents on the user device associated with a user and a prompt asking the user to choose a document type for each document of the plurality of documents; transmit, to the user device, the first graphical user interface for display; receive, from the user device, an indication that a first document of the plurality of documents is a first document type; identify a plurality of dates from the language data; determine, using the position data, that the plurality of dates is aligned in a first direction; count the plurality of dates; determine that the count of the plurality of dates is greater than a predetermined count threshold; and responsive to determining that the plurality of dates is aligned in the first direction and that the count of the plurality of dates is above the predetermined count threshold, create a first label for the first document referring to the first document as the first document type.

Clause 10: The system of clause 9, wherein the first graphical user interface presents the user with a plurality of labels to select from.

Clause 11: The system of clause 9, wherein the memory stores further instructions that are configured to cause the system to: generate, a second graphical user interface comprising the first label of the first document; and transmit the second graphical user interface to the user device for display.

Clause 12: The system of clause 9, wherein the memory stores further instructions that are configured to cause the system to: determine whether the plurality of dates is within a predetermined time threshold; and responsive to determining that the plurality of dates is aligned in the first direction, that the count of the plurality of dates is greater than the predetermined count threshold, and that the plurality of dates is within the predetermined time threshold, create a second label for the first document referring to the first document as the first document type.

Clause 13: The system of clause 12, wherein the memory stores further instructions that are configured to cause the system to: determine that the plurality of dates is outside the predetermined time threshold but within a secondary time threshold, wherein the secondary time threshold is different from the predetermined time threshold; generate a second graphical user interface with a second prompt asking the user whether the first document should continue to be analyzed as the first document type; transmit, the second graphical user interface to the user device for display; and receive, from the user device, a first indication whether the first document should be analyzed as the first document type; and responsive to determining that the plurality of dates is aligned in the first direction, determining that the plurality of dates is within the secondary time threshold, and determining that the count is greater than the predetermined count threshold, create a third label for the first document referring to the first document as the first document type.

Clause 14: The system of clause 9, wherein the memory stores further instructions that are configured to cause the system to: determine that the count of the plurality of dates is outside the predetermined count threshold but within a secondary count threshold, wherein the secondary count threshold is different from the predetermined count threshold; generate a second graphical user interface with a second prompt asking the user whether the first document should continue to be analyzed as the first document type; transmit, the second graphical user interface to the user device for display; and receive, from the user device, a second indication whether the first document should be analyzed as the first document type; and responsive to determining that the plurality of dates is aligned in the first direction, and determining that the count is greater than the secondary count threshold, create a third label for the first document referring to the first document as the first document type.

Clause 15: A statement identification system comprising: one or more processors; memory in communication with the one or more processors and storing instructions that are configured to cause the system to: automatically receive document image data of a document from a user device; process, using optical character recognition, the document image data to create language data and position data associated with the language data; identify a plurality of dates from the language data; determine, using the position data, that the plurality of dates is aligned in a first direction; determine whether the plurality of dates is within a predetermined time threshold; responsive to determining the plurality of dates is aligned in the first direction and determining that the plurality of dates is within the predetermined time threshold, create a first label indicating the document is a first document type: responsive to the first label indicating the document is the first document type: generate a first graphical user interface for displaying a first message to a user stating the document is the first document type; transmit the first graphical user interface to the user device for display; responsive to determining the plurality of dates is not aligned in the first direction or determining that the plurality of dates is not within the predetermined time threshold: generate a second graphical user interface for displaying a second message stating the document is not the first document type; and transmit the second graphical user interface to the user device for display.

Clause 16: The system of clause 15, wherein the memory stores further instructions that are configured to cause the system to: count the plurality of dates; determine whether the count of the plurality of dates is greater than a predetermined count threshold; and responsive to determining that the plurality of dates is aligned in the first direction, that the count of the plurality of dates is greater than the predetermined count threshold, and that the plurality of dates is within the predetermined time threshold, create a second label for the document referring to the document as the first document type.

Clause 17: The system of clause 16, wherein the memory stores further instructions that are configured to cause the system to: determine that the plurality of dates is outside the predetermined time threshold but within a secondary time threshold, wherein the secondary time threshold is different from the predetermined time threshold; generate a third graphical user interface with a second prompt asking the user whether the document should continue to be analyzed as the first document type; transmit, the third graphical user interface to the user device for display; and receive, from the user device, an indication whether the document should be analyzed as the first document type; and responsive to determining that the plurality of dates is aligned in the first direction, determining that the plurality of dates is within the secondary time threshold, and determining that the count is greater than the predetermined count threshold, create a third label for the document referring to the document as the first document type.

Clause 18: The system of clause 15, wherein generating the second graphical user interface further comprises prompting the user to rescan the document.

Clause 19: The system of clause 15, wherein generating the second graphical user interface further comprises displaying one or more images of one or more pages of the document and asking the user to select the first document type or a second document type different from the first document type.

Clause 20: The system of clause 19, wherein the memory stores further instructions that are configured to cause the system to: receive, from the user device, a selection of the first document type; create a second label indicating the document is the first document type; generate a third graphical user interface for displaying a third message to the user stating the document is the first document type; and transmit the third graphical user interface to the user device for display.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alterna-tively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A statement identification system comprising:
one or more processors;
memory in communication with the one or more processors and storing instructions that are configured to cause the system to:
automatically receive document image data of a document from a user device;
process, using optical character recognition, the document image data to create language data and position data associated with the language data;
identify a plurality of dates from the language data;
determine, using the position data, whether the plurality of dates is aligned in a first direction;
determine whether the plurality of dates is within a predetermined time threshold;
count the plurality of dates;
determine whether the count of the plurality of dates is greater than a predetermined count threshold;
responsive to determining that the plurality of dates is aligned in the first direction, determining that the plurality of dates is within the predetermined time threshold, and determining that the count is greater than the predetermined count threshold:
create a first label for the document;
generate, a first graphical user interface for displaying a message to a user comprising the first label; and
transmit, the first graphical user interface, to the user device for display.

2. The system of claim 1, wherein the memory stores further instructions that are configured to cause the system to:

generate, a second graphical user interface for displaying the document image data and a first prompt that allows the user to modify the first label;

transmit the second graphical user interface to the user device for display;

receive, from the user device, modification instructions for how to revise the first label;

revise the first label of the document according to the modification instructions from the user device;

generate a third graphical user interface for displaying the revised first label; and transmit the third graphical user interface to the user device for display.

3. The system of claim 2, wherein determining that the plurality of dates is in the first direction, determining that the plurality of dates is within the predetermined time threshold, and determining that the count is greater than the predetermined time threshold is completed by an algorithm trained by the modification instructions from the user device to revise the first label.

4. The system of claim 1, wherein determining that the plurality of dates is aligned in the first direction, determining that the plurality of dates is within the predetermined time threshold, and determining that the count is greater than the predetermined time threshold is completed by a machine learning model trained by examples of statements and user feedback.

5. The system of claim 1, wherein the memory stores further instructions that are configured to cause the system to:

determine whether the plurality of dates is consecutive; and responsive to determining that the plurality of dates is aligned in the first direction, that the count of the plurality of dates is greater than the predetermined count threshold, that the plurality of dates is within the predetermined time threshold, and that the plurality of dates is consecutive, create a second label for the document.

6. The system of claim 1, wherein the position data comprises coordinate positions of the language data on a page and the memory stores further instructions that are configured to cause the system to:

filter the language data and the position data to only include the plurality of dates.

7. The system of claim 1, wherein the memory stores further instructions that are configured to cause the system to:

determine that the plurality of dates is outside the predetermined time threshold but within a secondary time threshold, wherein the secondary time threshold is different from the predetermined time threshold;

generate a second graphical user interface with a second prompt asking the user whether the document should continue to be analyzed as a statement;

transmit, the second graphical user interface to the user device; and receive, from the user device, an indication whether the document should be analyzed as the statement;

responsive to determining that the plurality of dates is aligned in the first direction, determining that the plurality of dates is within the secondary time threshold, and determining that the count is greater than the predetermined count threshold:

create a second label for the document;

generate, a third graphical user interface for displaying the message to the user comprising the second label; and transmit, the third graphical user interface, to the user device for display.

8. The system of claim 1, wherein the memory stores further instructions that are configured to cause the system to:

determine that the count of the plurality of dates is outside the predetermined count threshold but within a secondary count threshold, wherein the secondary count threshold is different from the predetermined count threshold;

generate a second graphical user interface with a second prompt asking the user whether the document should continue to be analyzed as a statement;

transmit, the second graphical user interface to the user device; and receive, from the user device, an indication whether the document should be analyzed as the statement responsive to determining that the plurality of dates is aligned in the first direction, determining that the plurality of dates is within the predetermined time threshold, and determining that the count is greater than the secondary count threshold:

create a second label for the document;

generate, a third graphical user interface for displaying the message to the user comprising the second label; and transmit, the third graphical user interface, to the user device for display.

9. A statement identification system comprising:

one or more processors;

memory in communication with the one or more processors and storing instructions that are configured to cause the system to:

automatically receive document image data of a document from a user device;

process, using optical character recognition, the document image data to create language data and position data associated with the language data;

identify a plurality of dates from the language data;

determine, using the position data, that the plurality of dates is aligned in a first direction;

determine whether the plurality of dates is within a predetermined time threshold;

count the plurality of dates;

determine whether the count of the plurality of dates is greater than a predetermined count threshold; and responsive to determining the plurality of dates is aligned in the first direction, determining that the plurality of dates is within the predetermined time threshold, and determining that the count is greater than the predetermined count threshold:

create a first label indicating the document is a first document type:

responsive to the first label indicating the document is the first document type:

generate a first graphical user interface for displaying a first message to a user stating the document is the first document type;

transmit the first graphical user interface to the user device for display;

responsive to determining the plurality of dates is not aligned in the first direction, determining that the plurality of dates is not within the predetermined time threshold, or determining that the count is not greater than the predetermined count threshold:

generate a second graphical user interface for displaying a second message stating the document is not the first document type; and transmit the second graphical user interface to the user device for display.

10. The system of claim 9, wherein the memory stores further instructions that are configured to cause the system to:

responsive to determining that the plurality of dates is aligned in the first direction, that the count of the plurality of dates is greater than the predetermined count threshold, and that the plurality of dates is within the predetermined time threshold, create a second label for the document referring to the document as the first document type.

11. The system of claim 10, wherein the memory stores further instructions that are configured to cause the system to:

determine that the plurality of dates is outside the predetermined time threshold but within a secondary time threshold, wherein the secondary time threshold is different from the predetermined time threshold;

generate a third graphical user interface with a second prompt asking the user whether the document should continue to be analyzed as the first document type;

transmit, the third graphical user interface to the user device for display; and receive, from the user device, an indication whether the document should be analyzed as the first document type; and responsive to determining that the plurality of dates is aligned in the first direction, determining that the plurality of dates is within the secondary time threshold, and determining that the count is greater than the predetermined count threshold, create a third label for the document referring to the document as the first document type.

12. The system of claim 9, wherein generating the second graphical user interface further comprises prompting the user to rescan the document.

13. The system of claim 9, wherein generating the second graphical user interface further comprises displaying one or more images of one or more pages of the document and asking the user to select the first document type or a second document type different from the first document type.

14. The system of claim 13, wherein the memory stores further instructions that are configured to cause the system to:

receive, from the user device, a selection of the first document type;

create a second label indicating the document is the first document type;

generate a third graphical user interface for displaying a third message to the user stating the document is the first document type; and transmit the third graphical user interface to the user device for display.

15. A document identification system comprising:

one or more processors;

memory in communication with the one or more processors and storing instructions that are configured to cause the system to:

automatically receive document image data of a plurality of documents from a user device;

process, using optical character recognition, the document image data to create language data and position data associated with the language data;

identify a plurality of dates from the language data;

determine, using the position data, that the plurality of dates is aligned in a first direction;

determine whether the plurality of dates is within a predetermined time threshold;

count the plurality of dates;

determine that the count of the plurality of dates is greater than a predetermined count threshold; and responsive to determining that the plurality of dates is aligned in the first direction, determining that the plurality of dates is within the predetermined time threshold, and determining that the count of the plurality of dates is greater than the predetermined count threshold, create a first label for the first document referring to the first document as the first document type.

16. The system of claim 15, the memory stores further instructions that are configured to cause the system to:

generate a first graphical user interface for displaying the documents on the user device associated with a user, wherein the first graphical user interface presents the user with a plurality of labels to select from; and transmit, to the user device, the first graphical user interface for display.

17. The system of claim 15, wherein the memory stores further instructions that are configured to cause the system to:

generate, a second graphical user interface comprising the first label of the first document; and transmit the second graphical user interface to the user device for display.

18. The system of claim 15, wherein the memory stores further instructions that are configured to cause the system to:

determine that the plurality of dates is outside the predetermined time threshold but within a secondary time threshold, wherein the secondary time threshold is different from the predetermined time threshold;

generate a second graphical user interface with a second prompt asking the user whether the first document should continue to be analyzed as the first document type;

transmit, the second graphical user interface to the user device for display; and receive, from the user device, a first indication whether the first document should be analyzed as the first document type; and responsive to determining that the plurality of dates is aligned in the first direction, determining that the plurality of dates is within the secondary time threshold, and determining that the count is greater than the predetermined count threshold, create a second label for the first document referring to the first document as the first document type.

19. The system of claim 15, wherein the memory stores further instructions that are configured to cause the system to:

determine that the count of the plurality of dates is outside the predetermined count threshold but within a secondary count threshold, wherein the secondary count threshold is different from the predetermined count threshold;

generate a second graphical user interface with a second prompt asking the user whether the first document should continue to be analyzed as the first document type;

transmit, the second graphical user interface to the user device for display; and receive, from the user device, a second indication whether the first document should be analyzed as the first document type; and responsive to determining that the plurality of dates is aligned in the first direction and determining that the count is greater than the secondary count threshold, create a second label for the first document referring to the first document as the first document type.

\* \* \* \* \*